Patented Oct. 26, 1926.

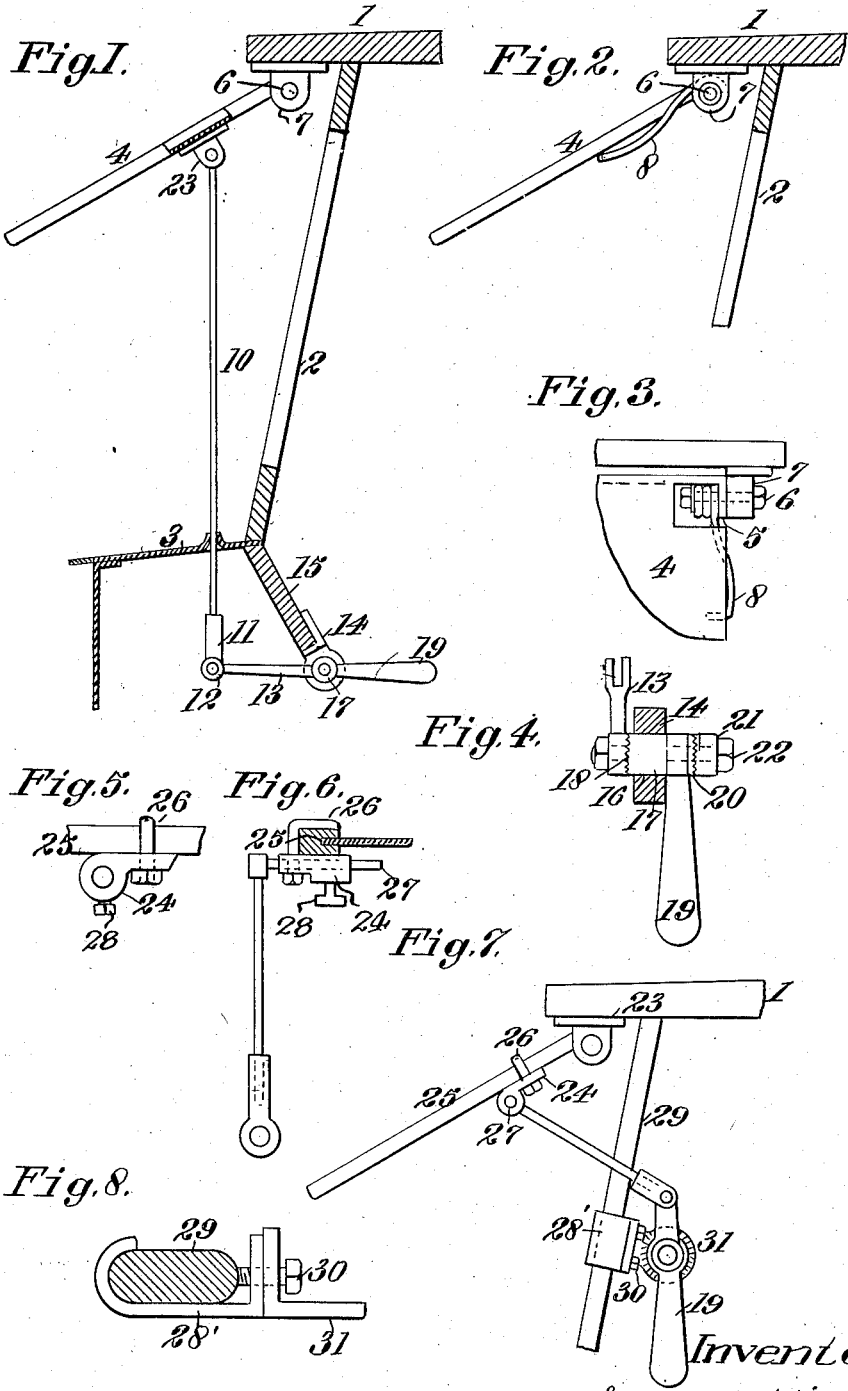

1,604,694

UNITED STATES PATENT OFFICE.

GEORGE N. HEIN, OF SAN FRANCISCO, CALIFORNIA.

MEANS FOR OPERATING VEHICLE SUNSHADES.

Application filed October 27, 1923. Serial No. 671,129.

In the types of sunshades as at present employed, wherein the sunshade is fulcrumed to swing at one edge on a horizontal axis, the liability is always present of the adjusting means breaking, which would permit the sunshade to drop and overlie the windshield obstructing the vision of the operator.

The present invention relates to a sunshade of the type fulcrumed at one edge to swing on a horizontal axis and provided with means preferably in the form of a spring for overcoming the weight of the shade and of sufficient strength to raise the shade should the adjusting means fail to function. The present invention further relates to an adjusting member adapted for opposing the action of the spring or other means for raising the sunshade, the adjusting member adapted for operation from a point in the rear of the windshield and adapted for being locked in position to sustain the sunshade. The invention further relates to an adjustable form of lever and operating handle construction designed for use in connection with a sunshade of the above type.

With the above-mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings forming a part of this application, Fig. 1 is a view in side elevation, partly in section, of a vehicle construction illustrating the preferred embodiment of my invention showing particularly the operating lever for controlling the adjustment of the sunshade.

Fig. 2 is a view in detail of the elevating spring associated with the sunshade for clearness the operating means for controlling the adjustment of the sunshade being eliminated.

Fig. 3 is a detailed view of the tension spring at one end of the sunshade.

Fig. 4 is a sectional view through the control lever.

Fig. 5 is a view in end elevation of the sunshade clamp.

Fig. 6 is an end view of the sunshade clamp.

Fig. 7 is a view similar to Fig. 1 of another embodiment of the invention and

Fig. 8 is a view in top plan of the lever mounting bracket.

Referring more particularly to the drawings wherein like charatcers of reference designate corresponding parts, 1 indicates the top or roof of a vehicle and 2 the windshield thereof rising from the cowl 3. 4 is a sunshade of any well known type and the frame of the same at the opposite ends of its rear edge is downwardly turned as at 5 providing eyes through which pass fulcrum members 6. The fulcrum members also pass through openings in the brackets 7 one associated with each end of the sunshade and which are secured to the under side of the roof 1 at its forward edge. The brackets 7 and members 6 afford a horizontal point of fulcrum on which the sunshade 4 is adapted to swing. Associated with one of the members 6 to bear at one end against the brackets 7 and at its opposite end against the sunshade 4 is a sunshade supporting spring 8 of any desired type, but of sufficient strength to normally raise the free edge of the sunshade 4 on the release of resistance from its fulcrum points or other holding mechanism. From this construction it will be observed that after the sunshade is adjusted and locked in the desired position, that should the locking means break, the liability of the sunshade falling downwardly and blocking the vision of the operator is overcome as the spring 8 tends to move the sunshade in an opposite direction.

With the spring held type of sunshade it will be readily observed that a means must be provided for locking the sunshade in its adjusted position and due to the desirability of adjusting the sunshade from the driver's compartment of the vehicle when in motion, it has been found essential to provide a means operatable from the rear of the vehicle windshield and the preferred embodiment of this mechanism is illustrated in Fig. 1 and constructed as follows. The cowl 3 is provided with an opening in which is mounted to reciprocate a rod 10 extending vertically in front of the wind shield 2. The rod connects at its lower end with a link 11 fulcrumed as at 12 to the outer end of a lever 13. In the present illustration the lever is carried by a bracket 14 secured to the lower edge of the vehicle instrument board 15 and said bracket is provided with a transverse opening 16 through which passes a fulcrum pin 17 mounted to rotate within the opening 16. The end of lever 13 is operated to receive the reduced end of pin 17 and is serrated at 18 to engage the serrations on the end of the main body of the member 17 fulcrumed in the opening 16. A handle 19 is also received on the opposite reduced end of the member 17 with one face of its hub contacting with one face of the bracket 14, and the same on its outer face is provided with serrations 20 for engagement by the serrations on the washer 21 slipped over the reduced end of member 17 and forced against the face of the handle head when the nut 22 on the end of the member 17 is tightened. This construction enables the relative angular adjustment of the lever 13 and handle 19 about the fulcrum pin 17.

Secured preferably to the center bar of the sunshade 4 is a bracket 23, Fig. 1, to which is pivotally connected the upper end of the rod 10. It will be observed that on the movement of the handle 19, the nut 22 controlling the frictional movement thereof, enables the vehicle operator, from the driver's seat to change the angle of the sunshade 4 at will and with but little effort. The member 10 if it is desired, may be in the form of a flexible connection or cable in which instance it is only used as a pull down for the sunshade.

Referring to Figs. 5, 6, 7 and 8, I have illustrated the sunshade embodiment and operating means set forth in Figs. 1 to 4 inclusive in connection with a vehicle of the open type and the only points of difference in this installation and that illustrated in Figs. 5 and 6, and the shield standard clamp illustrated in Fig. 8. The bracket forming the connection between the member 10 and the sunshade consists in preferably a face plate 24 for contacting with one face of the sunshade frame 25 and said plate 24 mounts an L clamp 26 for clamping the frame 25 to the face plate 24. Longitudinally movable in an aperture in the face plate 24 and disposed parallel with the fulcrum point of the sunshade is a rod 27 held in adjusted position by a set screw 28 with which the member 10 connects. In this embodiment I dispense with the bracket 14 illustrated in Fig. 1 and utilize a hooked support 28' for engaging around the windshield standard 29, said member 28 being retained in position by the set screw 30 which unites the bracket 31 to said member 28.

In each instance the bracket 14 or bracket 31 on its face is provided with serrations with which coact corresponding serrations on the lever 19.

In the embodiment illustrated in Fig. 7 it will be observed that the operator is by the convenient positioning of the handle 19 enabled to freely operate the sunshade without stopping the vehicle and without leaving the driver's seat or assuming any unnatural position.

While the drawing illustrates and the specification sets forth the invention as employed in connection with a vehicle sunshade, it will be understood that the same is equally as well adapted for use in connection with pivotally mounted windshields.

Having thus described my invention what I claim as new and desire to protect by Letters Patent of the United States is:—

1. In combination with a sunshade projecting in advance of a vehicle windshield and pivotally mounted for free swinging movement on a horizontal axis to permit its forward edge to raise and lower, a spring associated with the pivotal point of the sunshade for overbalancing the same to normally maintain a lifting tension to raise its free edge, a lever operatable from the rear of the vehicle windshield for moving the sunshade on its pivot and for locking the same in its adjusted position, and an operating connection extending from the lever upwardly through the vehicle cowl in advance of the vehicle windshield and connected with the sunshade affording an operating connection between the lever and the sunshade.

2. In combination with a sunshade projecting in advance of a vehicle windshield and pivotally mounted for free swinging movement on a horizontal axis to permit its edge to raise and lower, spring means coacting with the sunshade for normally maintaining an upward pressure thereon and of sufficient tension to raise the free edge of the sunshade when retarding tension is released therefrom, a lever pivotally connected to the vehicle body and extending beneath the vehicle cowl, and a link connecing the lever with the sunshade in advance of its pivotal point, said link extending through the cowl and lying in advance of the vehicle windshield.

3. In combination with a sunshade projecting in advance of a vehicle windshield and pivotally mounted for free swinging movement on a horizontal axis to permit its forward edge to raise and lower, pivotal means operatable from the rear of the vehicle windshield and extending beneath the vehicle cowl for moving said sunshade on its pivot and for locking the same in its adjusted position, a spring associated with the fulcrum point of the sunshade to raise the free end of said sunshade when said operating lever is moved out of its locked position, and a pivotal link connection between the lever and sunshade and extending in advance of the vehicle windshield and through the vehicle cowl.

4. In combination with a sunshade projecting in advance of a vehicle windshield and pivotally mounted for free swinging movement on a horizontal axis to permit its forward edge to raise and lower, a lever operatable from the rear of the vehicle windshield for moving the sunshade on its pivot and for locking the same in its adjusted position, and an operating connection extending from the lever upwardly through the vehicle cowl in advance of the vehicle windshield and connected with the sunshade affording an operating connection between the lever and the sunshade.

In testimony whereof I have signed my name to this specification.

GEORGE N. HEIN.